(12) United States Patent
Duckett, III

(10) Patent No.: US 10,484,615 B2
(45) Date of Patent: Nov. 19, 2019

(54) OPTICAL ZOOM SYSTEM AND METHOD FOR ITS USE

(71) Applicant: KARL STORZ Imaging, Inc., Goleta, CA (US)

(72) Inventor: George E. Duckett, III, Castaic, CA (US)

(73) Assignee: KARL STORZ Imaging, Inc., Goleta, CA (US)

( * ) Notice: Subject to any disclaimer, the term of this patent is extended or adjusted under 35 U.S.C. 154(b) by 0 days.

(21) Appl. No.: 15/892,647

(22) Filed: Feb. 9, 2018

(65) Prior Publication Data

US 2018/0167560 A1 Jun. 14, 2018

Related U.S. Application Data

(63) Continuation of application No. 15/271,057, filed on Sep. 20, 2016, now Pat. No. 9,930,262.

(51) Int. Cl.
| | |
|---|---|
| *G02B 3/12* | (2006.01) |
| *H04N 5/232* | (2006.01) |
| *G02B 3/14* | (2006.01) |
| *G02B 7/04* | (2006.01) |
| *G02B 9/14* | (2006.01) |
| *G02B 23/24* | (2006.01) |
| *G02B 15/22* | (2006.01) |
| *H04N 5/225* | (2006.01) |

(52) U.S. Cl.
CPC .......... *H04N 5/23296* (2013.01); *G02B 3/14* (2013.01); *G02B 7/04* (2013.01); *G02B 9/14* (2013.01); *G02B 15/22* (2013.01); *G02B 23/2438* (2013.01); *G02B 23/2446* (2013.01); *H04N 2005/2255* (2013.01)

(58) Field of Classification Search
CPC ........ G02B 3/12; G02B 13/009; G02B 15/14; G02B 15/16; G02B 15/161
USPC ................................ 359/665, 666, 676, 691
See application file for complete search history.

(56) References Cited

U.S. PATENT DOCUMENTS

| | | | |
|---|---|---|---|
| 4,488,039 A | 12/1984 | Sato | |
| 4,784,479 A | 11/1988 | Ikemori | |
| 6,919,914 B2 | 7/2005 | Beutter | |
| 7,889,434 B2 | 2/2011 | Pauker | |
| 2005/0200973 A1 | 9/2005 | Kogo | |
| 2005/0270664 A1 | 12/2005 | Pauker | |

(Continued)

FOREIGN PATENT DOCUMENTS

| | | |
|---|---|---|
| EP | 2157782 A2 | 2/2010 |
| JP | 2000139819 | 5/2000 |

(Continued)

*Primary Examiner* — William Choi
(74) *Attorney, Agent, or Firm* — Michael J. Loi; David Noel Villalpando

(57) ABSTRACT

A camera head is provided that includes a first lens group, including at least one deformable lens with variable curvature, a second lens group moveable relative to the first lens group, and an image sensor for capturing a light beam received from an endoscope, wherein the first lens group is fixed relative to the image sensor and the aperture of the first lens group is smaller than the aperture of the second lens group. A method is also provided for capturing of an image utilizing a zoom system including a variable power first lens group and a movable second lens group.

24 Claims, 5 Drawing Sheets

(56) References Cited

U.S. PATENT DOCUMENTS

| | | | |
|---|---|---|---|
| 2007/0041101 A1* | 2/2007 | Goosey, Jr. | G02B 3/14 |
| | | | 359/676 |
| 2010/0231783 A1 | 9/2010 | Bueler | |
| 2012/0130162 A1 | 5/2012 | Dolt | |
| 2012/0143004 A1 | 6/2012 | Gupta | |
| 2013/0066150 A1 | 3/2013 | Lee | |

FOREIGN PATENT DOCUMENTS

| | | |
|---|---|---|
| JP | 2007094170 | 4/2007 |
| WO | 2006037772 | 4/2006 |
| WO | 2006071042 A1 | 7/2006 |
| WO | 2010004493 A1 | 1/2010 |

\* cited by examiner

OPTICAL ZOOM SYSTEM AND METHOD FOR ITS USE

CROSS-REFERENCE TO RELATED APPLICATIONS

This application is a continuation of U.S. patent application Ser. No. 15/271,057, filed 20 Sep. 2016, and entitled "Optical Zoom System", which is hereby incorporated by reference.

FIELD OF THE INVENTION

The invention relates to an optical zoom system. The zoom system may be implemented in an optoelectronic device that couples or is integrated with an optical instrument.

BACKGROUND OF THE INVENTION

Optical instruments such as endoscopes, borescopes, and exoscopes may include an electronic imaging device located, for example, at the distal end of an elongated shaft or in a camera head which is connected to an elongated shaft. Whether positioned at the distal end of the endoscope shaft or in the camera head, the electronic imaging device may be one or more charge coupled devices (CCDs) or CMOS imaging devices together with other electronic components. Other electronic devices such as LED or other light sources may be included in the instrument. The camera head (or an instrument body or handle in the case of some optical instruments) is typically connected via a suitable cable to a camera control unit, commonly referred to as a "CCU."

The cable provides paths for carrying electrical power to the camera head and data signals to and from the camera head. In particular, image data captured by the imaging device is transmitted over the cable to the CCU for processing and ultimately for display on monitors which are connected directly to the CCU or to an intermediate device. Control signals and power for operating the electronic components in the instrument may be transmitted over the cable from the CCU to the scope and/or camera head.

An endoscope 2, as illustrated in FIG. 1, usually includes a first imaging lens (e.g., an objective) followed by a series of carrier lenses (e.g., relays) which capture and transmit an optical image from inside an enclosed area 1 to the outside. The proximal end of the endoscope 2 may be attached, via direct coupling or an adaptor, to a camera head 3 or an eye-piece for viewing. The camera head 3 usually includes lenses for receiving the optical image and forming a real optical image onto the image sensor. The digital image captured by the image sensor can then be transmitted to a CCU or other similar modules for analysis and display.

Endoscopic imaging is difficult due to limitations of form factor, propagation losses, and the wide range of distances at which objects are observed with an endoscope. The small diameter of the light carrier and corresponding light beam also makes zooming and focusing particularly difficult. Because of the small diameter, most conventional lens actuators require too much radial space to be used. However, some liquid lenses can fill the light channel and can vary without movement.

The endoscope lens in Pauker, et al. (U.S. Pat. No. 7,889,434) includes a number of lens units where each lens can be individually reshaped by hydraulic pressure to change the focal length of each one. Each lens is a liquid lens containing a compressible liquid or gas so that when pressure is introduced to the gaps between the lenses the optical power of the lens changes. This method enables a set of fixed liquid lenses to focus and zoom.

Pauker also discloses varying the position of several solid lenses by varying the pressure of a medium disposed in sealed chambers in between each lens of the lens cylinder. These pressure variations push the lenses closer of farther apart, changing the focal length of the lens unit. Both the methods of variable focus in Pauker, however, require complicated hydraulics, specialized fluids and sealed chambers which are difficult to manufacture and use.

A number of different lens systems are disclosed in Bueler, et al (US 2010/0231783) which have varifocal deformable lenses along with solid lenses in various arrangements, the entire disclosure of which is incorporated herein by reference. Some of the varifocal zoom lenses simply change in optical power while others can flip between positive and negative optical power allowing the lens to focus or expand the light beam.

In addition, Bueler discloses several varifocal and deformable lenses which are used in either the zoom lens or the focal lens, or both. Both the deformable zoom lens and deformable focal lens are constructed of a membrane with a deformable portion and a filler material. The deformable portion can be tuned at least in part by an electrostatic actuator, an electromagnetic actuator, a piezo-motor, a magneto-strictive actuator, a stepper motor, or an electroactive polymer actuator for a high focus tuning range.

Kuiper, et al. (US 2011/0118610) discloses an endoscope with a zoom lens and a movable image sensor, where the zoom lens is a liquid zoom lens with no membrane in between two immiscible liquids. This allows for manipulation of the curvatures of the two different liquids to change the optical power of the lens. To offset the resulting change in focal plane, the image sensor is moved to the correct location. Thus, in this setup, no focal lens is needed downstream of the zoom lens.

However, the prior art devices use deformable lenses instead of moveable lenses due to the limitations of the form factor of an endoscope. The small diameter of the endoscope requires small lenses to be used. In the prior art, if solid moveable lenses are used to zoom or focus, they require actuators along their outside edges which require additional radial space.

Thus, in order for conventional systems to use moving lenses, these lenses must be even smaller. The listed prior art above describes these limitations as necessitating the replacement of the smaller moving lenses with liquid deformable lenses. These liquid lenses have several disadvantages including the need for specialized actuators for displacing fluid, low durability and resilience, and higher optical imperfections like variable astigmatisms which cannot be corrected. They are also difficult to manufacture and use.

BRIEF SUMMARY OF THE INVENTION

It is therefore an object of the invention to provide the features of optical zoom and optical focus in a small form factor. Since the zoom system is placed on or near the side of a device that receives an optical image, the light beam can be expanded before focusing and capturing. This expanded beam allows for movable, solid lenses to be used in the now wider aperture area. The device disclosed in this application incorporates this novel feature to expand the beam before one or more, larger lens groups shape the light beam. With only one deformable lens, this system is easier to manufacture and use as well as cheaper.

According to a first aspect of the invention, an optoelectronic device for an optical instrument includes both an image sensor and a zoom system disposed along a common optical path. The zoom system includes a plurality of lens groups for imaging an optical image from the optical instrument. The plurality includes, in relative order along the common optical path, a first lens group and a second lens group. The first lens group includes at least one deformable lens with a variable curvature and is fixed relative to the image sensor. The second lens group is optically arranged between the first lens group and the image sensor and is adapted to move relative to the first lens group in a direction substantially coaxial with at least a portion of the common optical path.

In a first implementation according to the first aspect, the optoelectronic device is a camera head for an endoscope, exoscope, and/or borescope.

According to a second aspect of the invention, an optical instrument includes an objective for providing an optical image, a zoom system, and an image sensor, each disposed along a common optical path. The zoom system includes a plurality of lens groups for imaging the optical image, the plurality of lens groups including a first lens group and a second lens group. The first lens group includes at least one deformable lens with a variable curvature and is fixed relative to the image sensor. The second lens group is optically arranged between the first lens group and the image sensor and is adapted to move relative to the first lens group in a direction substantially coaxial with at least a portion of the common optical path.

In a first implementation according to the second aspect, the optical instrument further includes a shaft and at least one optical element arranged within the shaft for transferring the optical image, wherein the at least one optical element is optically arranged between the objective and the zoom system.

According to a third aspect of the invention, an optical instrument system includes an optical instrument that includes a shaft, an objective for providing an optical image, and at least one optical element arranged within the shaft for transferring the optical image. The optical instrument system further includes an optoelectronic device for processing the optical image. The optoelectronic device includes an image sensor and a zoom system, both disposed along a common optical path. The zoom system includes a plurality of lens groups for imaging the optical image. The plurality of lens groups includes, in relative order along the common optical path, a first lens group and a second lens group. The first lens group includes at least one deformable lens with a variable curvature and is fixed relative to the image sensor. The second lens group is optically arranged between the first lens group and the image sensor, the second lens group adapted to move relative to the first lens group in a direction substantially coaxial with at least a portion of the common optical path.

The optical instrument system may further include a camera head that includes the optoelectronic device and a camera control unit adapted to communicatively couple with the camera head. The camera control unit may include video encoder circuitry configured to encode a digital image sequence according to a video encoding format. The optical instrument system may further include an electronic display for receiving a video signal.

In a first implementation according to any of the foregoing aspects and implementations of the invention, the first lens group and the second lens group have optical powers of opposite signs. For example, the second lens group may have a negative optical power and the first lens group may have a variable positive optical power, but the relationship may be reversed, such that the second lens group has a positive optical power and the first lens group has a variable negative optical power. Optoelectronic devices may be adapted to vary the optical power of the first lens group via the at least one deformable lens.

In a second implementation according to any of the foregoing aspects and implementations of the invention, the plurality of lens groups further includes a third lens group that is fixed relative to the image sensor and optically arranged between the second lens group and the image sensor for projecting the optical image onto a surface of the image sensor.

In a third implementation according to any of the foregoing aspects and implementations of the invention, the first lens group includes at least two deformable lenses.

Further scope of the applicability of the present invention will become apparent from the detailed description given hereinafter. However, it should be understood that the detailed description and specific examples, while indicating preferred embodiments of the invention, are given by way of illustration only, since various changes, combinations and modifications within the scope of the invention, as defined in the claims, will become apparent to those skilled in the art from this detailed description.

BRIEF DESCRIPTION OF THE SEVERAL VIEWS OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

As used herein, first elements (e.g., sensors and lenses) that are "optically arranged" in relation to other elements, refers to the first elements' position along an common optical path that includes first and other elements. For example, a lens group optically arranged between an image sensor and an objective, means that the lens group occupies a portion of the optical path that light travels (e.g., from the objective to the image sensor) for capturing images or video. "Optical instruments" include instruments such as microscopes, exoscopes, borescopes, endoscopes, telescopes, video and/or still-image cameras, including optoelectronic implementations thereof. "Optical image" is an image formed by the light rays from a self-luminous or an illuminated object that traverse an optical system or element.

Figure 1:
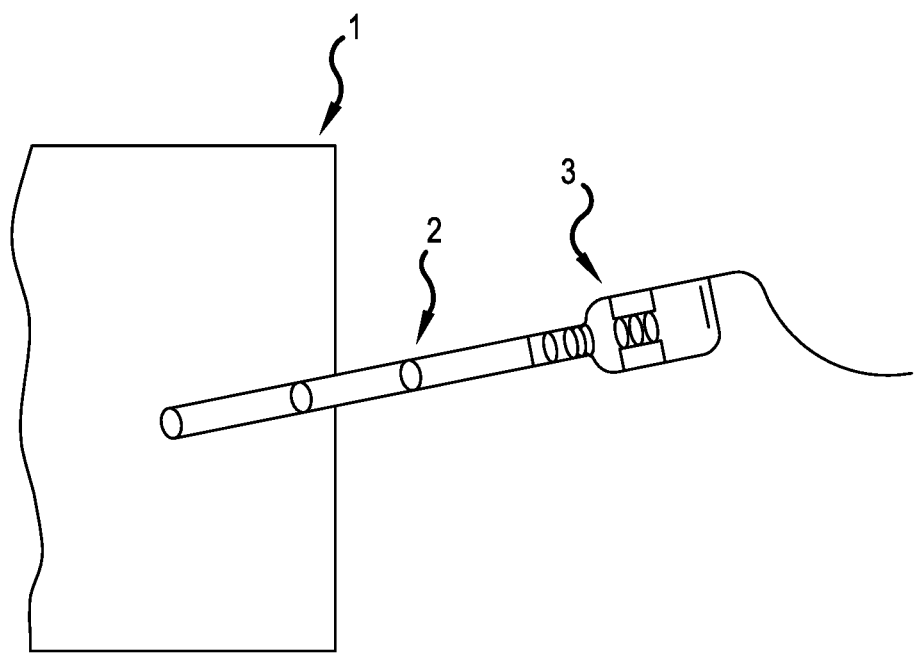
FIG. 1 is a prior art endoscope in use.
Figure 2:
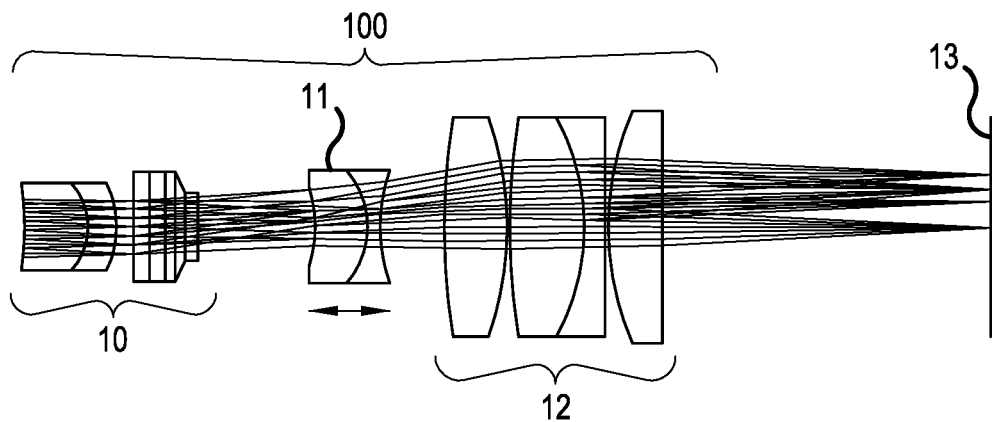
FIG. 2 is an optoelectronic device according to an exemplary embodiment.

The optoelectronic device of FIG. 2 shows a zoom system 100, which includes a first positive, fixed lens group 10 with a deformable lens having variable curvature, a second negative, moving lens group 11, as well as a third positive, fixed lens group 12, which projects an optical image onto a surface of an image sensor 13. The optoelectronic device may be coupled, directly or via an adaptor, to the proximal end of an endoscope with, for example, the positive, fixed lens group 10 receiving an optical image from the endoscope.

The one or more deformable lenses in the first positive, fixed lens group 10 vary in curvature to vary the focal power of the positive, fixed lens group 10. The positive, fixed lens group 10 may also include wave plates, polarization plates, and other positive or negative lenses. The negative, moving lens group 11 expands the light beam more if moved closer to the positive, fixed lens group 10 and expands the light beam less if moved away from it.

The deformable lens can be made of, for example, birefringent liquid crystal, a transparent elastic membrane filled with fluid, or a two fluid interface. The deformable lenses can be tuned at least in part by an electrostatic actuator, an electromagnetic actuator, a piezo-motor, a magneto-strictive actuator, a stepper motor, or an electroactive polymer actuator for a high focus tuning range.

Figure 3:
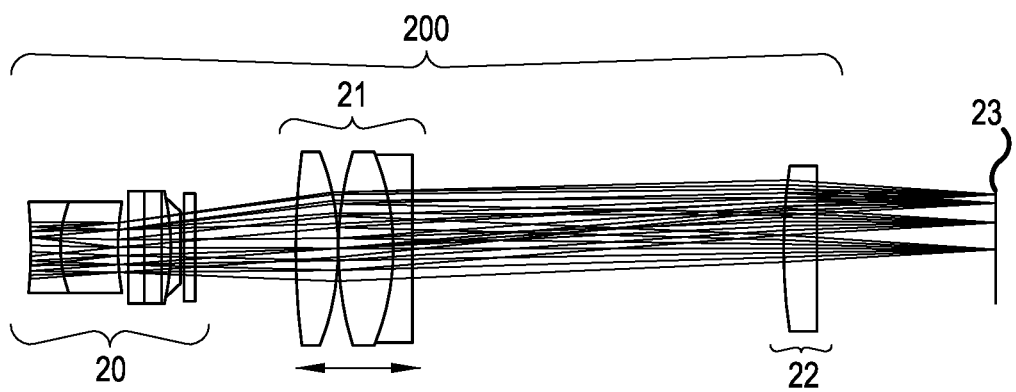
FIG. 3 is an optoelectronic device according to an exemplary embodiment.

The optoelectronic device of FIG. 3 shows another zoom system 200, which includes a first negative, fixed lens group 20 with a deformable lens having variable curvature and a second positive, moving lens group 21, as well as a third positive, fixed lens 22, which projects an optical image onto a surface of the image sensor 23. The deformable lens in this embodiment may have a variable negative or positive power for expanding the incoming light beam by varying amounts. The positive, moving lens group 21 adjusts, among other things, the focus of the light beam in response to the varying expansion of the deformable lens to maintain a focused image at the image sensor 23.

Figure 4:
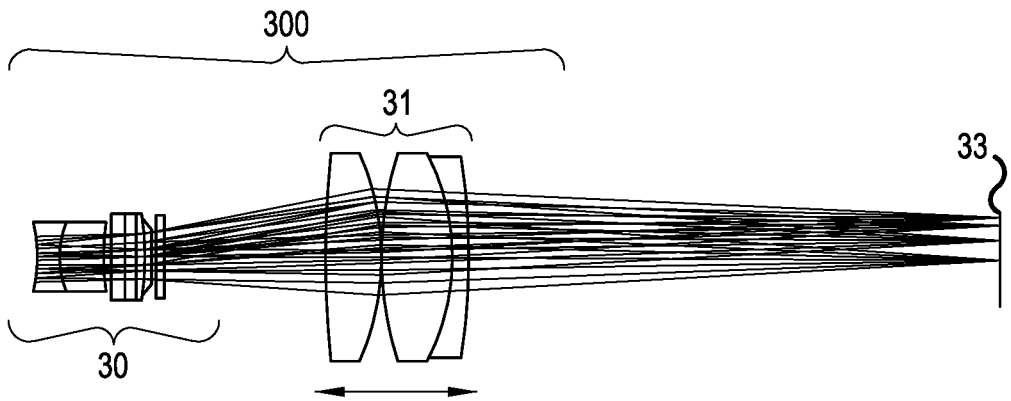
FIG. 4 is the optoelectronic device of FIG. 3 without an optional second fixed positive lens group.

The optoelectronic device of FIG. 4 shows yet another zoom system 300, which includes a first negative, fixed lens group 30 with a deformable lens having variable curvature and a second positive, moving lens group 31 which, among other things, projects an optical image onto a surface of the image sensor 33.

In the above embodiments, the zoom systems 100, 200, and 300 perform focusing and zoom in a small form factor and with minimal lenses. This results in an optoelectronic device with low losses and less chromatic aberrations. Optical zoom is accomplished by the deformable lens of the fixed lens groups 10, 20, and 30, and the respective moving lens group 11, 21, and 31 working together. Importantly, the zooming function may be mostly achieved by moving lens group 11, 21, and 31 and focus may be mostly maintained by the deformable lens of the fixed lens groups 10, 20, and 30.

Preferably, the initial negative, fixed lens group 20 or 30 expands the light beam to a diameter larger than the original diameter of the endoscope. This expanded light beam is more easily and losslessly manipulated. Larger, off-the-shelf lenses can also be used for the larger diameters. The image sensor 33 or 23 also has a larger imaging area to receive the expanded light beam. The light beam can also be split for imaging by more than one image sensor to provide a stereoscopic or higher-resolution view.

Apart from the relative arrangement, from the optical-image receiving side to the image-sensor side, of the zoom systems 100, 200, and 300 and respective image sensors 13, 23, and 33 (e.g., the left-to-right order along the optical path), any of the elements in FIG. 2-4 are interchangeable or insertable into any of these optoelectronic devices. For example, the negative, moving lens group 11 could be inserted after elements 20 or 30 to further expand the light beam. Likewise, element 12 could also be made moveable. Alternatively, the deformable lens in elements 10, 20 and 30 can vary between positive and negative optical powers or these elements can include a number of deformable lenses that collectively sum to positive or negative optical powers. Likewise, the optical powers of the individual lenses of the lens groups illustrated in FIG. 2-4 are purely exemplary and may include additional negative or positive lenses in each lens group.

Figure 5A:
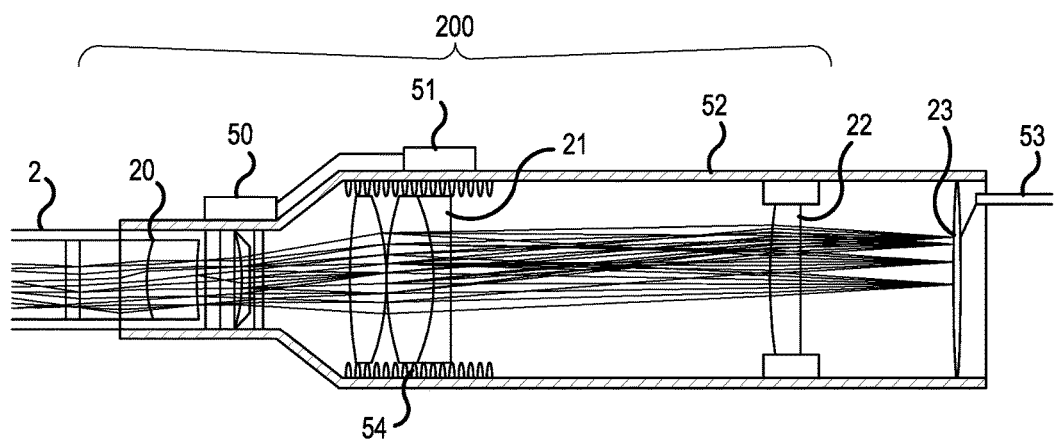
FIG. 5A is a camera head with the structure shown in FIG. 3.

A camera head, an example optoelectronic device, is shown in FIG. 5A including a housing 52, mechanical actuators 54 for moving the moveable lens groups 21, a lens controller 50 for deforming the deformable lenses 20, a cable 53, an electronic controller 51, and the optical coupling to the endoscope 2. The electronic controller 51 signals the mechanical actuators 54 and the lens controller 50, to control the moveable lens groups 21 and the deformable lenses 20 of zoom system 200. Preferably, the lens controller 50 includes electric actuators for deforming the deformable lenses 20. The output of the camera head can be passed to a CCU or similar module via the cable 53 for processing and display. The cable 53 may be electrical, electro-optical, and/or bidirectional. In bidirectional embodiments, the electronic controller 51 may be housed in a CCU or similar module or alternatively, shared between a camera head and CCU.

The mechanical actuators 54 for moving the lenses can be worm-screw actuators, solenoid actuators, rail-guided actuators, stepper motors, or any other linear actuator. The mechanical actuators may be controlled by an autofocus algorithm performed by the electronic controller 51 in response to the lens controller 50 and is advantageously electrically connected to the lens controller 50. The electronic controller 51 can also both be controlled by a computer (e.g., a CCU) that synchronizes them. A manual actuation of the moveable lenses will trigger an autofocusing adjustment by the liquid lens based on an autofocusing algorithm or saved focus settings.

Figure 5B:
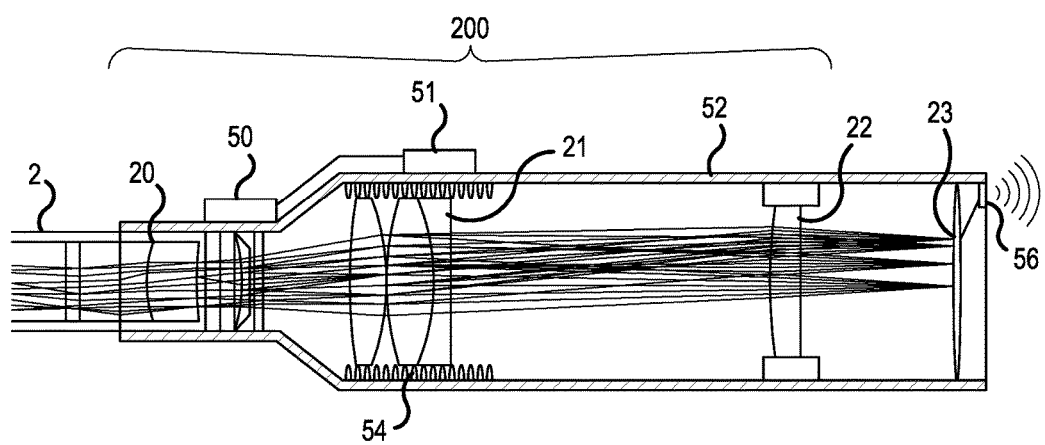
FIG. 5B is another camera head with the structure shown in FIG. 3.

The camera head shown FIG. 5B has a wireless transceiver 56 replacing the cable 53, for transmitting data to a camera control unit or an intermediate module (which forwards the transmitted information to a camera control unit or similar module) and receiving data and/or power. Also, the wireless transceiving ends can be adapted to withstand autoclaving. Camera head housing 52 may be an integral part of the optical instrument, such as endoscope 2. That is, at least the zoom system and the image sensor 23 may reside in the optical instrument and is thus not easily detached from the optical instrument. In wireless embodiments, a further camera head housing may be wirelessly coupled with the wireless transceiver 56 as well as communicatively coupled with and be powered by a CCU via electrical and/or electro-optical techniques, as described, for example, for the cable 53.

Figure 6A:
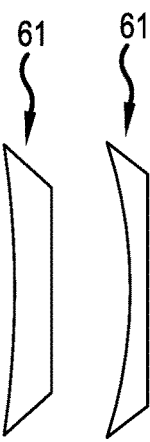
FIG. 6A is a deformable lens with variability within a range of negative optical powers.
Figure 6B:
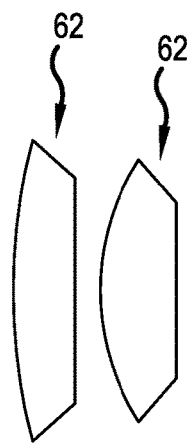
FIG. 6B is a deformable lens with variability within a range of positive optical powers.
Figure 6C:
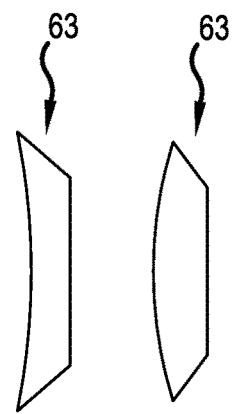
FIG. 6C is a deformable lens with variability within a range of positive and negative optical powers.
Figure 6D:
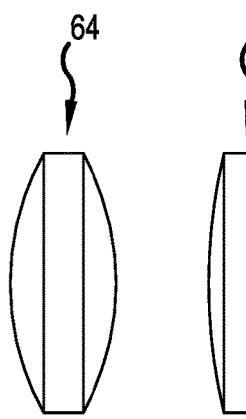
FIG. 6D is a deformable lens with two deformable surfaces.
Figure 6E:
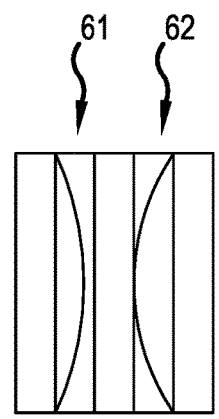
FIG. 6E is a series of deformable lenses usable in the systems of FIG. 2 through FIG. 4.

FIG. 6A shows a deformable lens 61 that can vary between different negative optical powers. FIG. 6B shows a deformable lens 62 that can vary between different positive optical powers, and FIG. 6C shows a deformable lens 63 that can vary between positive and negative optical powers. The exemplary deformable lenses shown in FIG. 6A-6C have only one deformable surface, but can have two deformable surfaces, as in deformable lens 64, which deform in parallel as in FIG. 6D. The left side of each of the lenses of FIG. 6A-6C is a deformable membrane with the internal portion of the lens being filled with a fluid. In addition, as shown in FIG. 6E at least two deformable lenses can be used together.

Figure 7:
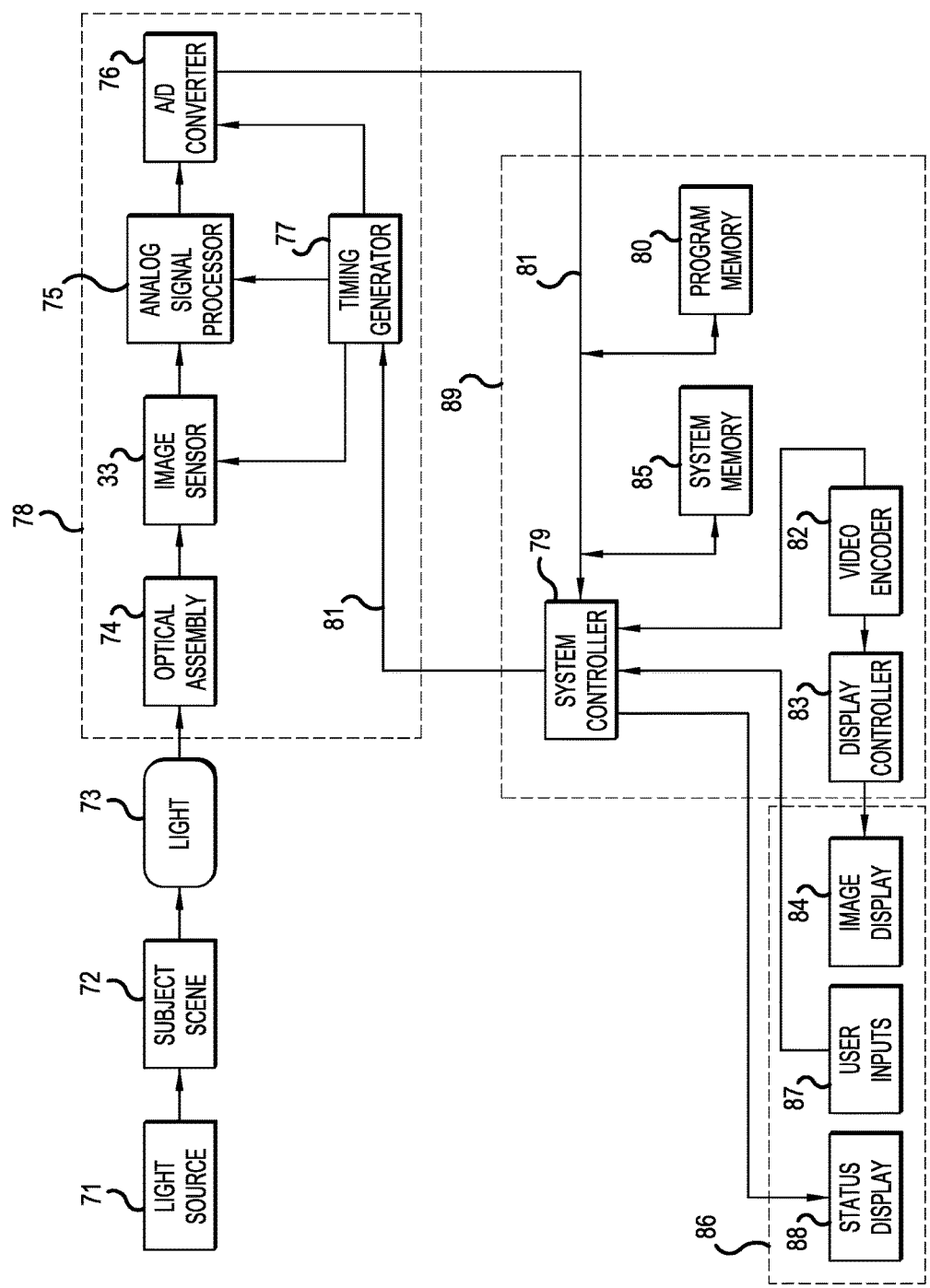
FIG. 7 is a hardware block diagram of an example optical instrument system according to an embodiment of the invention.

In FIG. 7, a block diagram of an optical instrument system illustrates the system connections. This system is clearly applicable to more than one type of optical instrument enabled for image capture, such as endoscopes, borescopes, or exoscopes incorporating solid state imagers, and digital microscopes, for example.

A light source 71 illuminates subject scene 72 and light 73 reflected from (or, alternatively, as in the case of digital microscopes, transmitted by) the subject scene forms, via an objective, an optical image that is transferred to an optical assembly 74, which may zoom, focus, and project (i.e. "images") the optical image onto a surface of a solid-state image sensor 33. An optical assembly 74 may include any one of the optical assemblies shown in FIGS. 2 to 4. Image sensor 33, then, converts the incident light to an electrical signal by, for example, integrating charge for each picture element (pixel). The image sensor 33 may be an active pixel complementary metal oxide semiconductor sensor (CMOS APS) or a charge-coupled device (CCD). An analog signal from the image sensor 33 is processed by analog signal processor 75 and applied to analog-to-digital (A/D) converter 76 for digitizing the analog sensor signals.

Timing generator 77 produces various clocking signals to select rows and pixels and synchronizes the operations of the image sensor 33, analog signal processor 75, and A/D converter 76. Camera head 78 includes the image sensor 33, the analog signal processor 75, the A/D converter 76, and the timing generator 77. The functional elements of the camera head 78 may be fabricated as a single integrated circuit as with CMOS image sensors or they may be separately-fabricated integrated circuits.

A system controller 79 controls the overall operation of the image capture device based on a software program stored in program memory 80. This memory can also be used to store user setting selections and other data to be preserved when the camera head 78 is turned off. A data bus 81 includes a pathway for address, data, and control signals.

Processed image data are continuously sent to a video encoder 82 to produce a video signal. This signal is processed by a display controller 83 and presented on an image display 84. This display is typically a liquid crystal display backlit with light-emitting diodes (LED/LCD), although other types of displays are used as well. The processed image data can also be stored in a system memory 85 or other internal or external memory device.

The user interface 86, including all or any combination of image display 84, user inputs 87, and/or status display 88, is controlled by a combination of software programs executed on the system controller 79. User inputs typically include some combination of typing keyboards, computer pointing devices, buttons, rocker switches, joysticks, rotary dials, and/or touch screens. The system controller 79 may manage the graphical user interface (GUI) presented on one or more of the displays (e.g. on image display 84). The GUI typically includes menus for making various option selections.

The system controller 79, system and the program memories 80 and 85, the video encoder 82, and the display controller 83 may be housed within a camera control unit (CCU) 89. The CCU 89 may be responsible for powering and controlling the light source 71 and/or camera head 78. As used herein "CCU" refers to units or modules that power, receive data from, manipulate data from, transmit data to, and/or forwards data from camera heads. CCU functionalities may be spread over multiple units, for example, a connection module, link module, or head module.

In the above embodiments, reference to an endoscope is intended merely as a representative example application and is not intended to be limiting. Implementations include other optical instruments including optical scopes such as microscopes, exoscopes, and/or borescopes in addition to endoscopes.

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. An optoelectronic device for an optical instrument, the optoelectronic device comprising:
    an image sensor and a zoom system, both disposed along a common optical path,
        the zoom system comprising a plurality of lens groups for imaging an optical image from the optical instrument, the plurality of lens groups comprising, in relative order along the common optical path:
            a first lens group having a first lens group aperture, the first lens group comprising at least one deformable lens with a variable curvature, the first lens group fixed relative to the image sensor; and
            a second lens group having a second lens group aperture wider than the first lens group aperture, the second lens group optically arranged between the first lens group and the image sensor, the second lens group adapted to move relative to the first lens group in a direction substantially coaxial with at least a portion of the common optical path.

2. The optoelectronic device of claim 1, wherein the second lens group has a negative optical power, and wherein the first lens group has a variable positive optical power.

3. The optoelectronic device according to claim 2, the plurality of lens groups further comprising a third lens group, fixed relative to the image sensor and optically arranged between the second lens group and the image sensor, for projecting the optical image onto a surface of the image sensor.

4. The optoelectronic device according to claim 1 wherein the second lens group has a positive optical power and wherein the first lens group has a variable negative optical power.

5. The optoelectronic device according to claim 4, the plurality of lens groups further comprising a third lens group having a positive optical power, wherein the third lens group is fixed relative to the image sensor and is optically arranged between the second lens group and the image sensor for projecting the optical image onto a surface of the image sensor.

6. The optoelectronic device according to claim 1, wherein the first lens group includes at least two deformable lenses.

7. The optoelectronic device according to claim 1, wherein the optoelectronic device is a camera head for an endoscope, exoscope, and/or a borescope.

8. An optical instrument comprising:
an objective for providing an optical image,
a zoom system, and
an image sensor, wherein the objective, the zoom system and the image sensor are disposed along a common optical path, and wherein the zoom system comprises a plurality of lens groups for imaging the optical image, the plurality of lens groups comprising, in relative order along the common optical path from the objective side:
a first lens group having a first aperture and including at least one deformable lens with a variable curvature, the first lens group being fixed relative to the image sensor; and
a second lens group having a second aperture, the second aperture being wider than the first aperture of the first lens group, the second lens group being optically arranged between the first lens group and the image sensor, and the second lens group adapted to move relative to the first lens group in a direction substantially coaxial with at least a portion of the common optical path.

9. The optical instrument according to claim 8 wherein the second lens group has a negative optical power, and wherein the first lens group has a variable positive optical power.

10. The optical instrument according to claim 9, the plurality of lens groups further comprising a third lens group fixed relative to the image sensor and optically arranged between the second lens group and the image sensor, for projecting the optical image onto a surface of the image sensor.

11. The optical instrument according to claim 8, wherein the second lens group has a positive optical power, and wherein the first lens group has a variable negative optical power.

12. The optical instrument according to claim 11, the plurality of lens groups further comprising a third lens group fixed relative to the image sensor and optically arranged between the second lens group and the image sensor, for projecting the optical image onto a surface of the image sensor.

13. The optical instrument according to claim 8, wherein the first lens group includes at least two deformable lenses.

14. The optical instrument according to claim 8, wherein the optical instrument is an endoscope, exoscope, and/or borescope.

15. The optical instrument according to claim 8 further comprising a shaft having at least one optical element arranged within the shaft for transferring the optical image, the at least one optical element optically arranged between the objective and the zoom system.

16. A method for capturing an image comprising the steps of:
providing an optoelectronic device, the optoelectronic device comprising, disposed along a common optical path,
an image sensor;
a zoom system; the zoom system comprising a plurality of lens groups for imaging the image, the plurality of lens groups comprising, in relative order along the common optical path
a first lens group with a first aperture area comprising at least one deformable lens with a variable curvature, the first lens group being fixed relative to the image sensor; and
a second lens group optically arranged between the first lens group and the image sensor, the second lens group having a second aperture area larger than the first aperture area, and the second lens group being adapted to move relative to the first lens group in a direction substantially coaxial with at least a portion of the common optical path;
illuminating a scene;
forming an image of the illuminated scene with an objective;
transferring the image to the optoelectronic device;
adjusting zoom and focus settings of the optoelectronic device by adjusting the power of the first lens system and the position of the second lens system such that a focused image is detected by the image sensor; and
capturing the image with the image sensor.

17. The method of claim 16 wherein the first lens system has a negative optical power and the second lens system has a positive optical power.

18. The method of claim 16 wherein the objective is an element of an instrument selected from a group consisting of endoscopes, exoscopes and borescopes.

19. The method of claim 16 wherein the objective is an element of a shaft, and wherein the shaft has a longitudinal axis parallel with the common optical path, and wherein the shaft may be removably connected to the optoelectronic device.

20. The method of claim 19 wherein the shaft further comprises one or more optical elements to transfer the objective gathered light to the optoelectronic device.

21. The method of claim 16 wherein the optoelectronic device is an element of a camera head.

22. The method of claim 21 wherein the image sensor is a digital image capture device.

23. The method of claim 22 wherein the captured digital image is transmitted wirelessly to a camera control unit.

24. The method of claim 23 wherein, when the second lens group is adjusted, an autofocusing adjustment by the first lens group is triggered, the autofocusing adjustment being controlled by the camera control unit.

* * * * *